J. EDMAN.
BUTTER DISH.
APPLICATION FILED JAN. 22, 1912.
1,060,973.
Patented May 6, 1913.
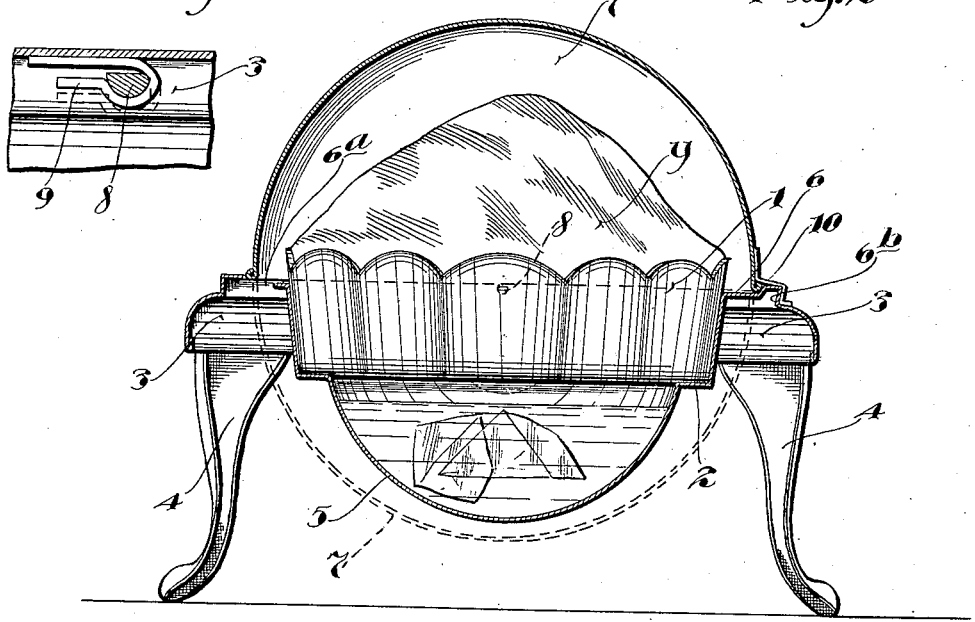
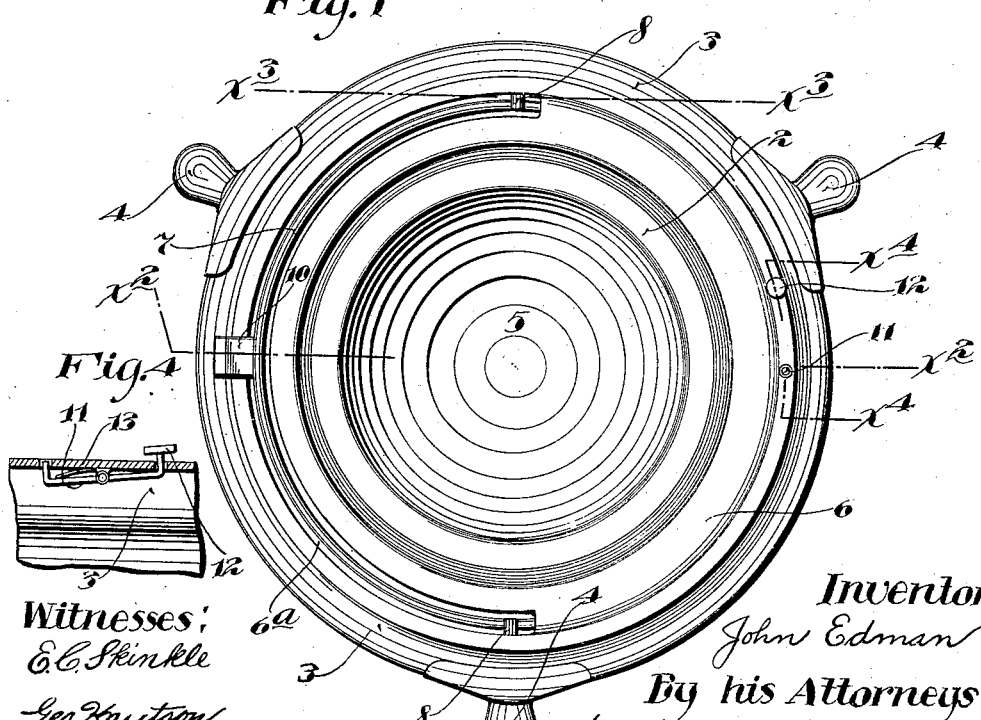
Witnesses:
E. C. Skinkle
Geo. Knutson
Inventor:
John Edman
By his Attorneys:
Williamson & Merchant

UNITED STATES PATENT OFFICE.

JOHN EDMAN, OF MINNEAPOLIS, MINNESOTA, ASSIGNOR OF ONE-SIXTH TO CHARLES STANDIFORD AND ONE-SIXTH TO CHARLES W. TARBOX, BOTH OF MINNEAPOLIS, MINNESOTA.

BUTTER-DISH.

1,060,973.  Specification of Letters Patent.  Patented May 6, 1913.

Application filed January 22, 1912. Serial No. 672,547.

*To all whom it may concern:*

Be it known that I, JOHN EDMAN, a citizen of the United States, residing at Minneapolis, in the county of Hennepin and State of Minnesota, have invented certain new and useful Improvements in Butter-Dishes; and I do hereby declare the following to be a full, clear, and exact description of the invention, such as will enable others skilled in the art to which it appertains to make and use the same.

My invention has for its object to improve butter dishes adapted to contain ice to keep the butter cold and having a movable cover for inclosing the butter and thereby protecting the same from flies and insects, and thereby keeping the butter in a cool sanitary condition.

To the above ends, generally stated, the invention consists of the novel devices and combinations of devices hereinafter described and defined in the claims.

In the accompanying drawings which illustrate the invention, like characters indicate like parts throughout the several views.

Referring to the drawings, Figure 1 is a plan view of the improved butter dish with the cover thereof turned downward into an inoperative position; Fig. 2 is a vertical section taken approximately on the line $x^2 x^2$ on Fig. 1, showing the dish cover turned upward into an operative position; Fig. 3 is a detail in section taken approximately on the line $x^3 x^3$ on Fig. 1; and Fig. 4 is a detail in vertical section taken approximately on the line $x^4 x^4$ on Fig. 1.

The butter $y$ is directly contained preferably in a glass or porcelain tray 1 which is seated in an annular ledge 2 of the spun metal dish body 3, supported by legs 4, preferably three in number. Below the tray supporting ledge 2, the dish body 3 is provided with a depression affording an ice chamber 5. The dish body 3 is provided with a rim portion 6 that extends outward from the seat in which the tray 1 is located and is formed with an approximately semi-circular slot $6^a$ through which an approximately semi-spherical metal cover 7 is adapted to move upward, and downward to and from an inoperative position. This semi-spherical cover 7 is provided with trunnions 8 that are preferably approximately semi-cylindrical in cross section and which are mounted in spring seats 9 formed by light spring rods bent approximately as shown in Fig. 3 and having the upper prongs soldered or otherwise rigidly attached to the rim of the dish body 3. The pressure of the prongs of the spring seats 9 on the semi-cylindrical or otherwise flattened trunnions 8, tends to hold the pivoted semi-spherical cover 7 either in its upturned operative or in its downturned inoperative position, according to the position in which it may be set. Furthermore, the spring action of the prong seats 9 exert a maximum tension on the trunnions 8, when the said cover is in an intermediate position and serves to complete the closing movement of said cover, when said cover is moved to one side of said intermediate position, and serves to complete the opening movement of said cover when said cover is moved to the opposite side of said intermediate position. To further secure the cover in its upturned operative position shown in Fig. 2, it is provided at its free edge with a spring clip 10 that springs over and frictionally engages an undercut shoulder $6^b$ of the rim 6 of the dish body. This spring clip 10 may be disengaged from the shoulder $6^b$ in different ways, but preferably, for this purpose, I provide a small releasing lever 11 that is intermediately pivoted to a lug on the under surface of the rim 6, (see Fig. 4), and is provided with upturned ends that work through perforations on the said rim. One upturned end of the lever 11 is provided with a finger piece 12 which is normally pressed upward by a light spring 13, and the other end of said lever, when the finger piece 12 is depressed, engages the free front edge of the cover 7 and forces the same upward far enough to release the clip 10 from the shoulder $6^b$.

The improved butter dish is, except for the tray 1, preferably made from light sheet metal spun or stamped to shape and nickel or silver plated, but it may also be made of thin sheets of German silver. In fact, it may be made of any suitable metal.

By the use of this improved dish, butter may be kept in a sanitary condition and covered so that it will not be exposed to flies and other insects and dirt, and by the use of ice in the chamber 5, the butter may be kept cold or cool even in warm weather.

This improved dish, while especially designed for containing butter, may, as is obvious, also be used to contain various other edibles.

What I claim is:

1. In a dish of the kind described, the combination with a body having spring acting trunnion seats, of a cover having flattened trunnions working in said trunnion seats, the said trunnion seats being arranged to exert a maximum tension on said trunnions when said cover is in an intermediate position, and serving to complete the closing movement of said cover when said cover is moved to one side of said intermediate position, and serving to complete the opening movement of said cover when said cover is moved to the opposite side of said intermediate position.

2. A dish of the kind described, comprising a body having a seat for the reception of a tray having a depression below said seat for the reception of ice, and having a rim formed with an approximately semi-circular slot, a pair of diametrically opposite prong spring seats secured to said rim at the extremities of said segmental slot, an approximately semi-spherical cover working through said segmental slot and having flattened trunnions mounted for oscillatory movements of 180 degrees in said spring seats, a spring clip on said cover engageable with a shoulder on said rib to yieldingly secure said cover in a closed position, and a finger actuated releasing device pivoted to said rim and operative on said cover to positively impart initial opening movement thereto.

In testimony whereof I affix my signature in presence of two witnesses.

JOHN EDMAN.

Witnesses:
HARRY D. KILGORE,
F. D. MERCHANT.

---

Copies of this patent may be obtained for five cents each, by addressing the "Commissioner of Patents, Washington, D. C."